United States Patent [19]
Igram

[11] Patent Number: 5,709,463
[45] Date of Patent: Jan. 20, 1998

[54] BACKLIGHTING FOR BRIGHT LIQUID CRYSTAL DISPLAY

[75] Inventor: Dale James Igram, Kokomo, Ind.

[73] Assignee: Delco Electronics Corporation, Kokomo, Ind.

[21] Appl. No.: 708,100

[22] Filed: Aug. 13, 1996

[51] Int. Cl.⁶ .................................................. F21V 7/20
[52] U.S. Cl. .................. 362/268; 362/19; 362/30; 362/32; 362/218; 362/294; 362/305; 362/307; 349/62; 349/64; 349/67; 349/161
[58] Field of Search ............... 379/58, 62, 64, 379/67, 72, 161; 362/19, 29, 30, 32, 218, 268, 294, 297, 304, 205, 307, 345, 355, 373, 318

[56] References Cited

U.S. PATENT DOCUMENTS

| | | | |
|---|---|---|---|
| 4,546,420 | 10/1985 | Wheeler et al. | 362/19 |
| 4,735,495 | 4/1988 | Henkes | 349/62 |
| 4,763,993 | 8/1988 | Vogeley et al. | 349/161 |
| 4,765,718 | 8/1988 | Henkes | 349/62 |
| 4,915,479 | 4/1990 | Clarke | 349/64 |
| 5,134,548 | 7/1992 | Turner | 362/29 |
| 5,146,248 | 9/1992 | Duwaer et al. | 349/67 |
| 5,459,592 | 10/1995 | Shibatiani et al. | 349/62 |
| 5,459,645 | 10/1995 | Sattler et al. | 362/30 |
| 5,657,163 | 8/1997 | Wu et al. | 359/630 |

FOREIGN PATENT DOCUMENTS

| | | | |
|---|---|---|---|
| 58-211742 | 12/1983 | Japan | 349/161 |
| 6-82745 | 3/1994 | Japan | 349/161 |

*Primary Examiner*—Alan Cariaso
*Attorney, Agent, or Firm*—Jimmy L. Funke

[57] ABSTRACT

A bright bulb with a parabolic or elliptical reflector project light through a duct with internal reflective walls to a liquid crystal display having the same or smaller area than the reflector area. The duct tapers from a circular entrance aperture to a rectangular exit aperture and enhances brightness and uniformity. An IR mirror between the lamp and the duct reflects heat to the lamp. A holographic diffuser at the exit aperture further improves uniformity. The LCD polarizer is mounted on the diffuser and spaced from the liquid crystal cell by an intervening cooling air passage to minimize heating of the cell. The display is suitable for HUD applications.

7 Claims, 1 Drawing Sheet

BACKLIGHTING FOR BRIGHT LIQUID CRYSTAL DISPLAY

FIELD OF THE INVENTION

This invention relates to illumination of liquid crystal displays and particularly to backlighting of such displays used for head up displays.

BACKGROUND OF THE INVENTION

In automotive vehicles passive displays such as active matrix LCDs are illuminated by backlighting for direct viewing or for head up displays (HUDs). HUDs used in automotive vehicles produce a virtual image by projecting a light pattern from an image source and reflecting it from a windshield in the line of sight of the operator. Windshields have a reflectivity less than 18%; thus in order to view the HUD image under bright sunlight conditions, a very bright image source is required.

The image sources used for HUDs include vacuum fluorescent displays (VFDs) and matrix addressable liquid crystal displays (LCDs). The brightness of a VFD is limited by the light emission mechanism of the phosphor which is bombarded by energetic electrons. Even though the brightness of VFDs have been improving over the years, it is expected to be less than 15,000 foot-Lambert (fL) for the bluish-green color, and much less for other colors. On the other hand, LCDs can provide a much brighter colored reconfigurable image source if bright illumination is available. The conventional illumination source is an incandescent bulb with collimating optics in the proximity of the LCD. Since the image source and related optics are located beneath the vehicle dash board, the packaging space requirements and the heat output of the lamps near the image source often can not be accommodated, especially for high brightness lamps.

Small LCDs suitable for HUD applications are conventionally illuminated by a tungsten-halogen bulb and reflector with IR filters, diffuser and fans. The filters and fans are required to manage the heat produced by the bulb, and, along with the diffuser contribute greatly to inefficiency of the display. Unfortunately, a conventional diffuser such as a Mylar (TM) sheet absorbs about 50% of the light, thereby reducing the image brightness or requiring increased light source intensity.

It has also been proposed in U.S. Pat. No. 5,459,645 to Sattler et al, entitled "WIDE ANGLE LIGHT COUPLER FOR IMAGE ILLUMINATION", assigned to the assignee of the present invention, to backlight an LCD by a light source coupled to the LCD by a tapered duct having a small end at the light source and a large end at the LCD and having a reflective inner surface to afford off-axis illumination. One or both ends of the tapered duct are covered with a thin diffuser (a plastic sheet) to enhance uniform illumination. Again substantial loss of light results from such diffusers.

Another proposal to obtain uniform illumination is to couple a high intensity discharge light source to a small end of a tapered duct by a fiber optic guide and to use a holographic diffuser at a larger end near the display to enhance light uniformity with small transmission loss.

Each of the proposals using a tapered duct have the goal of illuminating a large display with a small light source and/or controlling the off-angle viewability of the display. They also generally provide insufficient brightness for use in a HUD. Also, due to limited space beneath the dashboard, smaller display panels are desirable for HUD applications and the proposals do not address the need to illuminate display panels which are of about the same area as the light source or smaller.

SUMMARY OF THE INVENTION

It is therefore an object of the invention to yield a bright display suitable for a HUD using small backlighted LCDs. A further object is to couple a bright light source to an LCD of the same size or smaller than the light source with substantially uniform illumination.

In a HUD, a light source comprising a bright halogen bulb in a reflector is covered by an IR mirror which reflects heat back to the bulb and passes visible light. The IR mirror is adjacent a duct having reflective inner surface. The duct surface is shaped to match the light source size and shape at one end and the active area of an LCD at the other end. The light source is usually circular and the LCD is usually rectangular so that the duct shape includes a transformation from a circle at one end to a rectangle at the other end. The active area of the LCD is generally the same or smaller than the light source so that the duct is often tapered to accommodate the size difference. A holographic diffusing element at the display end of the duct improves brightness uniformity. The polarizer of the LCD is on the diffuser and the liquid crystal cell is spaced from the diffuser to allow a cooling air passage to protect the cell from the heat of the polarizer.

BRIEF DESCRIPTION OF THE DRAWINGS

The above and other advantages of the invention will become more apparent from the following description taken in conjunction with the accompanying drawings wherein like references refer to like parts and wherein.

DESCRIPTION OF THE INVENTION

The ensuing description is directed to backlighting an LCD. It will be appreciated that the invention is applicable to other passive displays. Also, the LCD or other display may be one that is directly viewed by the vehicle operator or one that is displayed by a HUD.

Figure 1:
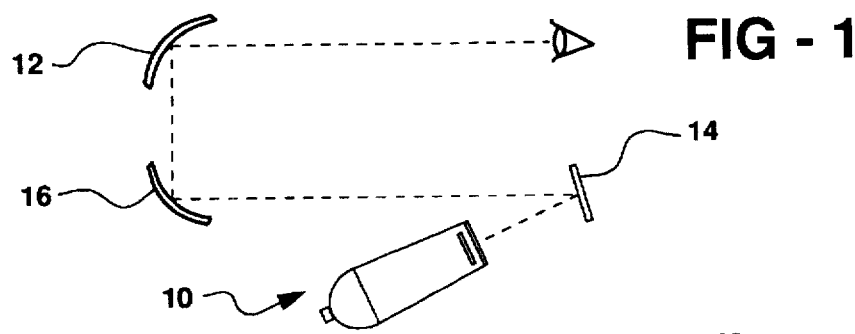
FIG. 1 is a schematic diagram of a HUD using a backlighting apparatus according to the invention.

Referring to FIG. 1, a head up display comprises an image source 10 for projecting an image via a mirror arrangement and a vehicle windshield 12 or other combiner to the eye of an observer. The mirror arrangement includes a folding mirror 14 for packaging convenience and an aspheric mirror 16 which is shaped to compensate for distortions which would otherwise be introduced by the curvature of the windshield 12. The aspheric mirror 16 also focuses the light to achieve a desired image size and apparent position of the image relative to the windshield.

Figure 2:
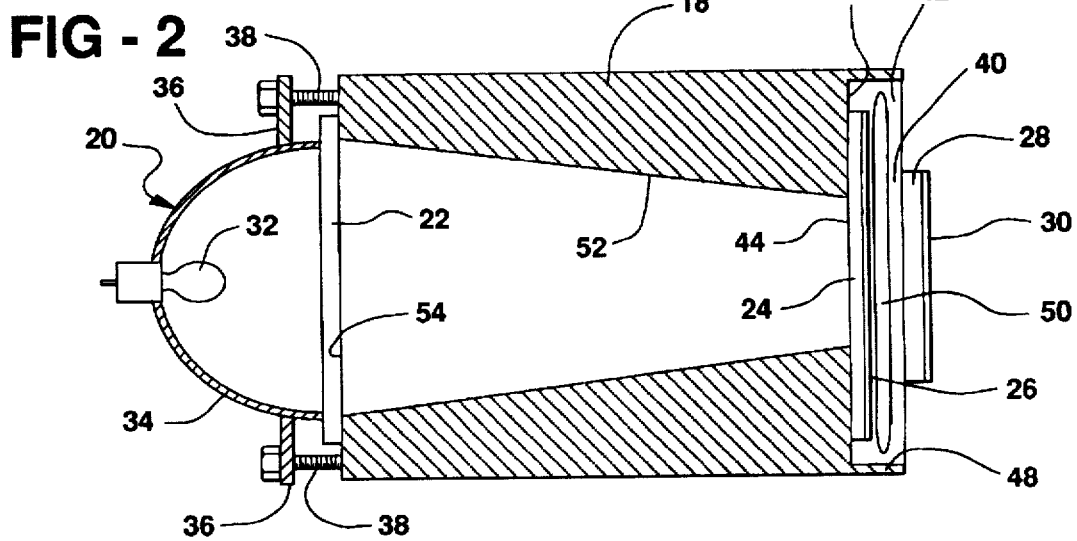
FIG. 2 is a cross section view of the backlighting apparatus of FIG. 1.

The image source, best shown in FIG. 2, comprises a tapered duct 18, a light source 20 at the entrance aperture of the duct, an IR mirror 22 between the light source 20 and the duct, a holographic diffuser 24 covering the exit aperture of the duct, a polarizer 26 adhered to the outer surface of the diffuser, and a liquid crystal cell 28 spaced from the diffuser 24 and the polarizer 26 and having an analyzer 30 on its outer surface.

The light source 20 includes a halogen bulb 32 supported in a reflector 34 shaped to optimize the light beam profile. A retainer ring 36 around the reflector secures the light source 20 and IR mirror 22 to the duct 18 by screws 38. A bright lamp, say 35 watts, must be used to achieve good HUD image brightness. A high intensity discharge lamp could be used instead, along with suitable cooling. The heat from either type of lamp poses a problem since the LCD has limited tolerance to high temperatures. The IR mirror 22 reflects 90% of the heat back to the light source and transmits 85% of the visible spectrum, thus forming a first heat barrier with minimal light loss at the entrance aperture.

A second heat barrier is formed at the exit aperture. Since an LCD requires a polarizer 26 at one side of the cell 28 and another polarizing element or analyzer 30 at the other side, much heat will be absorbed in the polarizing elements. At least 50% of the remaining heat in the light beam will be absorbed in the polarizer 26. To prevent direct conduction of the heat to the cell 28, instead of being laminated to the cell in the conventional manner, the polarizer is secured to the diffuser 24, leaving space for an air passage 40 between the cell and the polarizer for cooling ventilation.

Figure 4:
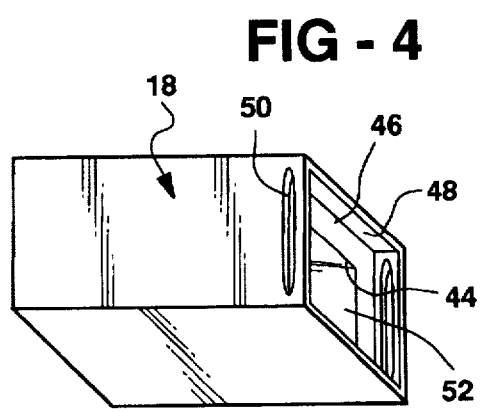
FIG. 4 is an isometric view of a duct used in the backlighting apparatus revealing the exit aperture.

The duct 18, as shown in FIG. 2, is a hollow block having a recess 42 surrounding the exit aperture 44, also shown in FIG. 4, the recess being surrounded by a flat mounting surface 46 bounded by outer walls 48. The diffuser 24 is mounted on the surface 46 over the aperture 44. Slots 50 in two opposed outer walls 48 facilitate air flow through the passage 40; a fan, not shown, mounted outside the duct forces air through the slots.

Figure 3:
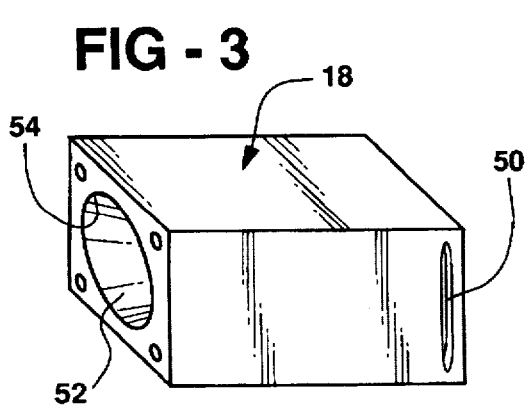
FIG. 3 is an isometric view of a duct used in the backlighting apparatus revealing an entrance aperture.

The duct includes a specularly reflecting inner surface 52 which extends between the entrance aperture 54, also shown in FIG. 3, and the exit aperture 44. The entrance aperture 54 matches the size and shape of the light source and thus is usually circular, while the exit aperture 44 matches the size and shape of the active region of the LCD and is thus generally rectangular. The inner surface 52 thus comprises the transformation between the two end shapes, and as shown in FIG. 2, tapers from the entrance aperture to the exit aperture. The slope of the taper depends on the relative sizes of the apertures, the available longitudinal space and the beam profile. Where the entrance and exit apertures have the same area, at least one of the rectangular dimensions of the exit will be less than the entrance diameter, so that one pair of opposed sides will taper down from the entrance to the exit as shown in FIG. 2. Where the exit area is smaller than the entrance, both dimensions may diminish from the entrance to the exit.

Figure 5:
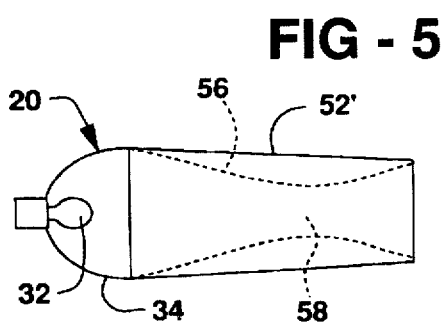
FIG. 5 is a diagram illustrating a beam profile from a light source using an elliptical reflector.

The profile of the light beam projected from the light source 20 depends on the bulb 32 and the reflector 34 shape. A wide range of light sources are commercially available and a choice is made to suit the specific application. FIG. 5 shows in broken lines the beam profile 56 of light from a lamp with an elliptical reflector. The inner surface of the duct 18 is indicated by lines 52'. The beam converges toward a beam waist 58 and then diverges toward the exit. The location and diameter of the beam waist varies with the light source. To optimally match the beam shape to the active region of the LCD, it is preferred that the beam waist be closer to the exit than to the entrance aperture, and that the beam waist diameter be at least 70% of the exit diagonal. The beam profile, as illustrated, refers to the main core of the light beam, but a substantial amount of stray light occurs outside the profile. While the main core does not appear to interact with the reflective inner surface 52 in some cases, the stray light does reflect from the duct surface to the exit aperture to improve the uniformity and brightness of the illumination.

An example of a backlighting arrangement achieving superior brightness used an elliptical reflector 3 cm in diameter and a 35 watt MR11 type halogen bulb 32. The duct was machined from aluminum containing 0.23% chromium and polished to a 1 micron finish. The entrance aperture was circular, matching the reflector in size, and the exit aperture was 2 by 2.65 cm, matching the active region of the LCD. The duct was 4.76 cm long and the beam waist occurred at 2.7 cm from the entrance aperture. The cell 30 is spaced 0.32 cm from the polarizer 26.

Figure 6:
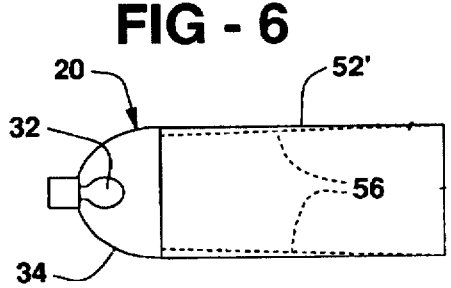
FIG. 6 is a diagram illustrating a beam profile from a light source using a parabolic reflector.

While the elliptical reflector is desirable for matching the beam profile to the active display area where the display is small relative to the light source area, a parabolic reflector ensures a better match if the display area is the same as or close to the light source area. FIG. 6 shows that the beam profile from the parabolic reflector is slightly divergent. In that case the duct has some taper due to the different aperture shapes; one pair of sides may taper in while the other pair taper out to form a rectangle. Still the stray light will reflect from the polished duct wall to enhance the brightness and uniformity. For either type of reflector the holographic diffuser 24 is necessary to obtain adequate uniformity. It is preferred to have a display brightness variation of no more than 50%; that is the dimmest part of the display illumination is at least half the brightness of the brightest part (usually the center).

The holographic diffuser 24 is a light shaping diffuser which is available from Physical Optics Corp., Torrence, Calif. The diffuser is a holographic film on a transparent substrate and preferably simulates a plano-concave lens and thus spreads the light at some angle. A diffusion angle of 20° to 60° is suitable, depending on the specific application. The holographic diffuser has the property of high transmissivity which decreases only slightly as the diffusion angle increases. For example, for a diffusion angle of 20° the transmissivity is 92% and for a diffusion angle of 60° the transmissivity is 85%. This high efficiency combined with excellent diffusion results in a bright uniform illumination of the LCD. The holographic diffuser homogenizes the output of a light source by substantially eliminating "hot spots" or variations in brightness caused by the light source, and it also shapes the beam profile by precisely controlling the energy distribution along both the horizontal and vertical axes. The diffuser is designed for each application to take into account the duct shape, beam profile and any other contributor to the brightness pattern, as well as the desired off-axis viewability of the display. Thus the duct design is not restricted by the need to achieve off-axis viewability and instead can be optimized for display brightness and light uniformity.

It will thus be seen that the present invention vastly improves LCD illumination by increased brightness as well as good uniformity. By concentrating light from a bright light source on a display area the same size as or smaller than the light source while preventing excessive heating of the LCD, the display brightness is exceptionally well suited to a HUD application. The duct efficiently couples light to the display, preventing the loss of stray light and redirecting stray light to make the light pattern more uniform. The use of a holographic diffuser further increases uniformity and compensates for the light beam profile from the light source. Such diffusers cause a much lower light loss than conventional diffusers.

The embodiments of the invention in which an exclusive property or privilege is claimed are defined as follows:

1. An image illumination apparatus for back lighting a display including a liquid crystal cell having an active region comprising:

a light source spaced from the display and having an area equal to or greater than the area of the active region;

an elongated duct having a specularly reflecting inner surface for coupling light from the light source to the display, a first aperture of the duct being adjacent the light source and substantially the same size and shape as the light source, a second aperture of the duct being aligned with the cell and having substantially the same size and shape as the active region of the cell;

the first aperture of the duct being covered by an IR reflecting mirror serving as a thermal barrier;

a holographic diffuser element over the second aperture for enhancing illumination uniformity;

the liquid crystal cell spaced from the diffuser element for illumination by light passing through the duct and the diffuser element; and an air cooling passage between the liquid crystal cell and the diffuser element.

2. The invention as defined in claim 1 wherein:

the active region and the second aperture of the duct are rectangular;

the light source and the first aperture of the duct are circular; and the inner surface of the duct comprises a gradual transformation between circular and rectangular apertures.

3. The invention as defined in claim 1 wherein:

the areas of the first and second apertures are substantially the same size;

the light source comprises a halogen bulb and a parabolic reflector, whereby the size of the light beam projected through the duct remains substantially the same.

4. The invention as defined in claim 1 wherein:

the area of the second aperture is substantially smaller than the first aperture; and the light source comprises a halogen bulb and an elliptical reflector, whereby the light beam projected through the duct converges to a beam waist formed in the duct and then diverges to exit the second aperture.

5. The invention as defined in claim 1 wherein:

the area of the second aperture is substantially smaller than the first aperture;

the light source comprises a halogen bulb and an elliptical reflector, whereby the light beam projected through the duct converges to a beam waist formed in the duct and then diverges to exit the second aperture; and the beam waist diameter is at least 70% of the diagonal of the second aperture.

6. The invention as defined in claim 1 wherein:

the area of the second aperture is substantially smaller than the first aperture;

the light source comprises a halogen bulb and an elliptical reflector, whereby the light beam projected through the duct converges to a beam waist formed in the duct and then diverges to exit the second aperture; and the beam waist is nearer the second aperture than the first aperture.

7. The invention as defined in claim 1 wherein the display includes:

an analyzer on a surface of the cell opposite the light source; and a polarizer on the diffuser element spaced from the liquid crystal cell whereby the polarizer absorbs heat from the light, and the polarizer and the air cooling passage form another thermal barrier to minimize heating of the cell.

* * * * *